F. HOFFMAN.
COMBINATION CODE CARD.
APPLICATION FILED SEPT. 2, 1909.

1,070,342.

Patented Aug. 12, 1913.

Fig. 1.

Fig. 2.

WITNESSES:

INVENTOR
F. Hoffman,
BY
J. M. Wright,
ATTORNEY

UNITED STATES PATENT OFFICE.

FRED HOFFMAN, OF SAN FRANCISCO, CALIFORNIA, ASSIGNOR TO NATIONAL CASH PROTECTOR COMPANY, OF SAN FRANCISCO, CALIFORNIA, A CORPORATION OF ARIZONA.

COMBINATION CODE-CARD.

1,070,342.      Specification of Letters Patent.    Patented Aug. 12, 1913.

Application filed September 2, 1909. Serial No. 515,900.

*To all whom it may concern:*

Be it known that I, FRED HOFFMAN, a citizen of the United States, residing at San Francisco, in the county of San Francisco and State of California, have invented new and useful Improvements in Combination Code - Cards, of which the following is a specification.

The present invention relates to a code or identification card for identifying the amount payable on checks, money orders, drafts, or the like to prevent fraudulent raising of said amounts, and also to identify the person to whom the amount is to be paid and the person from whose account it is to be paid. It is preferably used in conjunction with a machine which forms in the check or other paper a number of perforations, the positions of which are such that, when placed over said identification card, numerals will appear therethrough corresponding to the amount to be paid and to the countersign numbers of the drawer and payee.

In the accompanying drawing, Figure 1 is a plan view showing the identification card in use for identifying a check; Fig. 2 is a plan view of the card detached.

Referring to the drawing, 1 indicates an identification card having printed thereon a line 2 for the signature of the drawer, a countersign number 3 of the drawer, a countersign number 4 of the payee and a combination code 5. This code comprises a number of rows, seven being here shown, each containing all of the ten digits 6, arranged irregularly or out of numerical order in all of the rows.

In use, a check, shown at 7, is prepared for identification by forming a number of perforations therein comprising a row 8 of said perforations, which, when placed over the first row of the combination code will show the countersign number of the drawer, as "306", a bottom row 9 of perforations, which, when placed over the bottom row of the combination code, will show the numbers showing the countersign of the payee, as 352, and a series of single perforations variously arranged, which, when placed over the combination code, will show the numbers corresponding respectively to the tens of thousands, thousands, hundreds, tens and units, in the number of dollars for which the check is drawn. The drawing shows the numbers as being 5, 3, 1, 7, corresponding to the amount, $5,317.00.

I claim:

A device for identifying names and other data of checks and the like, comprising a sheet having printed thereon rows and columns of figures, each row comprising the ten digits, arranged in a fortuitous manner in the several columns, and also having printed thereon a number, and means for indicating that said number is a countersign, substantially as described.

In testimony whereof I have hereunto set my hand in the presence of two subscribing witnesses.

FRED HOFFMAN.

Witnesses:
    J. M. DAY,
    S. REYNOLDS.